T. L. MOUNT.
SYSTEM FOR CHARGING STORAGE BATTERIES.
APPLICATION FILED JUNE 19, 1918.
1,348,236.
Patented Aug. 3, 1920.
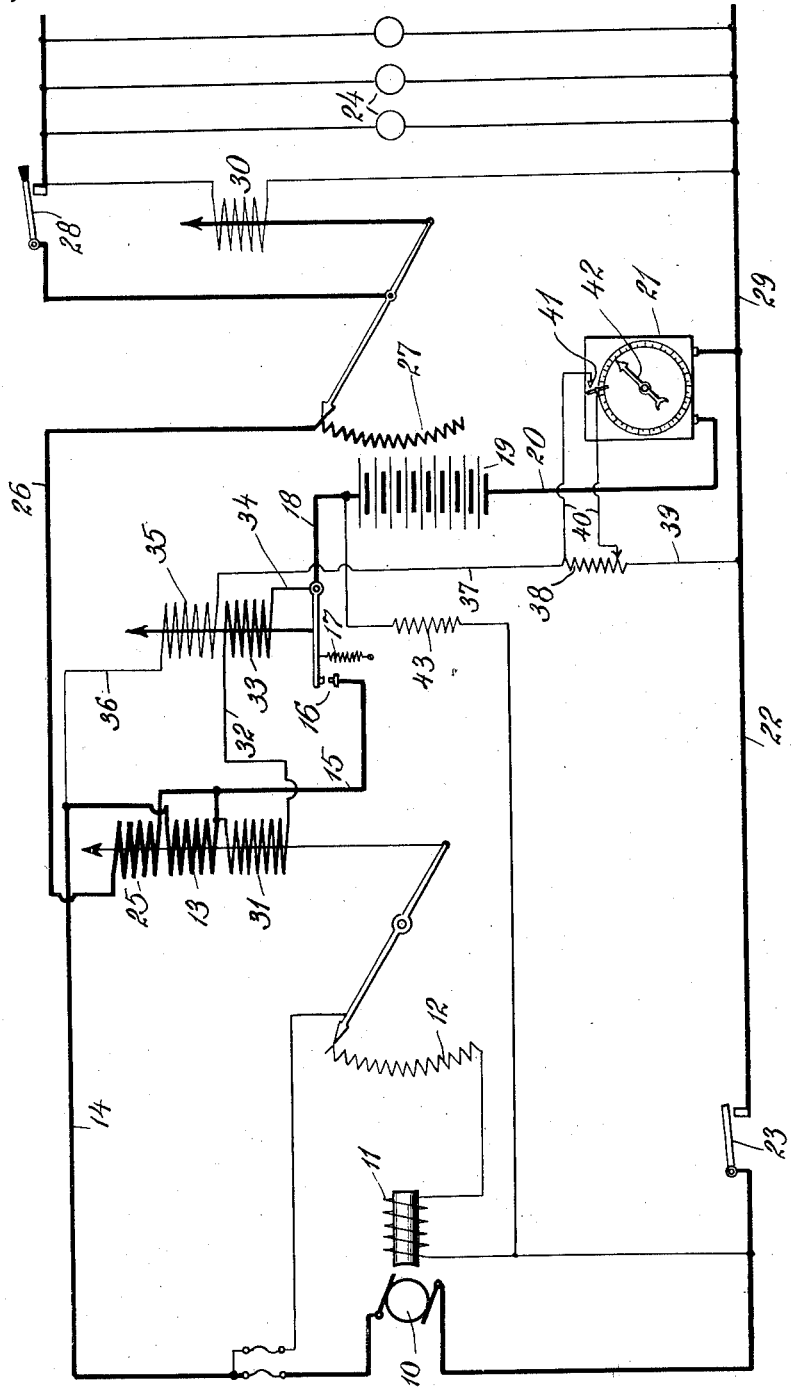
Inventor
Thomas L. Mount.
By his Attorneys
Pennie, Davis, Marvin & Edmonds

UNITED STATES PATENT OFFICE.

THOMAS L. MOUNT, OF NEW YORK, N. Y.

SYSTEM FOR CHARGING STORAGE BATTERIES.

1,348,236.  Specification of Letters Patent.  Patented Aug. 3, 1920.

Application filed June 19, 1918. Serial No. 240,824.

*To all whom it may concern:*

Be it known that I, THOMAS L. MOUNT, a citizen of the United States, residing at New York city, borough of Manhattan, in the county of New York, State of New York, have invented certain new and useful Improvements in Systems for Charging Storage Batteries; and I do hereby declare the following to be a full, clear, and exact description of the invention, such as will enable others skilled in the art to which it appertains to make and use the same.

The present invention which relates to a system for charging storage batteries is particularly applicable to those cases in which the generator is adapted to be driven at variable speed, as for instance, by an axle of a railroad car or other vehicle.

In such cases it is necessary to regulate the generator to compensate for variations in speed of the vehicle, and it is common to provide for this purpose a regulator having a current coil in series with the generator and arranged to act upon a variable resistance in series with the field of the generator to maintain the current delivered by the generator constant. To provide for stopping the charging current when the battery reaches a proper state of charge, it has been the usual practice to employ a shunt winding on the governing solenoid of the regulator, and keep the same inert until the battery reaches the desired condition of charge as determined by an ampere-hour meter or similar instrument, or by a relay responsive to the full charge voltage of the battery. In all of these cases, the instrument of relay is arranged to render the shunt winding on the regulator effective to predominate over the series winding and thereby produce constant voltage regulation of the generator to cause the battery charging current to taper to a small or negligible value depending upon the relation between the back voltage of the battery and the voltage of generator.

Systems of this general character are open to the objection that the current supplied to the battery after the instrument or relay has acted is usually an unknown or indefinite quantity, and it sometimes occurs in practice that the voltage coil of the regulator will cause so much resistance to be inserted in the field circuit of the generator, that the voltage of the generator will be reduced below that of the storage battery, and the automatic switch that connects the generator to the battery will be opened. When this occurs the system will be put in the condition to resume charging of the battery at the normal rate, so that the automatic switch will soon close again, but the effect of the voltage coil, which at once or shortly thereafter is rendered effective again, will be to cause another opening of the automatic switch and the cycle of operations will again occur. If the apparatus is not under continual supervision, and it usually is not when it is upon a railroad car, the action described above may continue over a considerable period of time and cause rapid deterioration of the contacts of the automatic switch.

The present invention seeks to overcome the above disadvantages of prior apparatus, by providing a system in which the battery may be charged at a constant rate irrespective of the load, and after it has reached a fully charged condition, the current may be reduced to a definite fixed amount, which in general should be sufficient to maintain the working parts of the apparatus in operative condition, that is, to supply the shunt coils of the automatic switch, and such other coils of the equipment as should remain energized during the time when the generator is not charging the battery, and at the same time supply a small maintaining current to the battery. In general, the current supplied at such a period in the operation of the apparatus should not be over three or four amperes, or just sufficient to insure that the battery will not discharge through the apparatus, and that the automatic switch will remain closed by virtue of the generator voltage being slightly above that of the battery.

The particular nature of the invention, and the manner in which the above and other objects of the invention are attained will appear more clearly from a description of a preferred embodiment thereof as shown in simplified form in the accompanying drawing, wherein 10 represents the armature of a generator provided with a shunt field 11, having in series therewith, the resistance 12 of a generator regulator (shown diagrammatically) comprising a main series winding 13 and certain other windings which will be hereinafter described. One terminal of the winding 13 is connected to one of the main conductors 14 leading from the generator, and the other terminal of the winding is connected by a conductor 15 to a switch 16 normally held closed by a spring 17. From this switch a conductor 18 leads to one terminal of the storage battery 19; from the other terminal of which a conductor 20 leads to an instrument for measuring the charge supplied to the battery. In the illustrated embodiment of the invention, this device is shown as an ampere-hour meter 21 which preferably should be so constructed as to run somewhat slower when the battery is charging than when discharging to compensate for the inefficiency of the battery, in accordance with the usual practice. From the meter, the circuit passes over a conductor 22 through the usual automatic switch 23 to the other terminal of the generator.

The circuit for the lamps 24 is taken off of the conductor 15, on the battery side of the winding 13 and passes through a winding 25 associated with the generator regulator and wound to oppose the winding 13. The winding 25 should preferably have the substantially same number of turns as winding 13 so as to neutralize the magnetic effect of the latter in proportion to the current consumed by the lamps, and thus through a readjustment of the regulator affect the field strength of the generator to increase the output of the latter to carry the lamp load in addition to charging the battery at the normal rate. Instead of proportioning the winding 25 so that it has substantially the same number of turns as the winding 13, it may bear any other suitable relation to the latter winding so as to cause the generator to carry any desired proportion of the lamp load. From the winding 25 the lamp circuit passes over conductor 26 through the usual lamp regulator 27 (shown diagrammatically), through the switch 28 to the lamps and thence over conductors 29 and 22 to the generator. The lamp regulator is shown as controlled by a voltage coil 30 connected between the main lamp conductors.

Associated with the generator regulator is a third winding 31 which is wound to aid winding 13, but should preferably be composed of relatively fine wire since it never carries a heavy current. One terminal of this winding is connected to the adjacent terminal of winding 13, and the other terminal is connected by a conductor 32 to a coil 33 of an electro-magnet or solenoid which is operatively associated with the switch 16, and finally the circuit of winding 31 and coil 33 is completed by a conductor 34 extending to the conductor 18. Associated with the magnet for controlling the switch 16 is another coil 35 having one terminal connected to the main conductor 14 by conductor 36, and the other terminal connected by a conductor 37 to a resistance 38, which in turn is connected to the other main conductor 22 of the system by a conductor 39. From the terminals of resistance 38, one of which should preferably be made adjustable, conductors 40 lead to a switch 41 associated with the ampere-hour meter and adapted to be actuated by the needle 42 of the same, when it reaches a position indicating a fully charged battery. A resistance 43 is connected between one terminal of the storage battery and the main conductor 22 on the generator side of the automatic switch 23.

In the general operation of the system described above, assuming the car to start from rest, the generator gradually increases in speed and when its potential reaches a predetermined value, the automatic switch 23 closes, and current flows to the battery and to any lamps that may be in use. By virtue of the series winding 13 of the regulator, the current output of the generator will be maintained constant irrespective of changes in speed, and if any lamps are lighted, the current taken by them and flowing through the opposing winding 25 on the regulator will partly neutralize the effect of winding 13 and alter the output of the generator so that it will carry the lamp load in addition to charging the battery at the desired rate. During the normal charging of the battery, the switch 41 of the ampere-hour meter is open, so that the entire resistance 38 is inserted in series with the actuating coil 35 of switch 16, and this resistance should be so proportioned that under these conditions this coil will not be energized sufficiently to overcome the effect of spring 17 to open the switch 16. The switch will therefore be held closed by the spring, and the battery circuit will be completed through the switch and conductors 15 and 18.

When the battery has received the charge required to bring it to a fully charged condition, as shown by the ampere-hour meter, the needle of the latter engages and actuates switch 41, thus establishing the short circuit about the resistance 38. The increase of current which then takes place in coil 35, is sufficient to energize this coil and cause it to open the switch 16. In other words, the short circuit through this switch, which previously existed about the winding 31 and coil 33 is now broken, so that they are connected in series with the winding 13 and the battery. It will be understood that the resistance 38 may be omitted entirely if desired, and the circuit of coil 35 may be controlled directly by the meter switch 41, since the current through the coil 35 is relatively small. In practice, however, it is of advantage to use the resistance to avoid the make and break of the circuit which would occur at the contacts of the meter if it directly controlled the circuit of the coil 35.

Under the conditions described above, the main winding 13 and the assisting winding 31 form in effect a series coil on the governing solenoid of the regulator having an increased number of effective turns as compared with the turns available when the winding 13 was alone effective. Since the equilibrium of the core of the solenoid is obtained through the balancing of the pull of the spring of the regulator against a definite number of ampere turns on the solenoid, it follows that the number of amperes necessary to maintain the core of the solenoid in its position of equilibrium will be considerably diminished, with the result that the battery charging current will be correspondingly reduced. While the winding 31 may be formed as a continuation of winding 13 and of the same size wire, it is preferable, since it never carries a heavy current, to form it of relatively fine wire, but in any event should be given a sufficient number of turns to cut the charging current down to any desired amount, such, for instance, as three or four amperes. The coil 33 will also be traversed by the current which now passes to the battery, and will act as a holding coil for retaining the switch 16 in its open condition, irrespective of whether or not the coil 35 would continue to perform this function under the new conditions of generator potential.

The system will remain in the condition described above, with the battery being charged at a low constant current rate until the car comes to a stop, whereupon the automatic switch opens and the cessation of current in the battery-charging circuit causes the holding coil 33 to be deënergized, thus restoring the switch 16 to normal circuit-closing condition. If during the stop of the car, no current is drawn from the battery, and the needle of the ampere-hour meter retains the switch 41 in circuit-closing position, the coil 35 may be energized as soon as the generator reaches the speed at which the automatic switch will be closed, whereupon the switch 16 will be again opened and the small maintaining current will continue to be supplied to the battery. If during the stop of the car, current is drawn from the battery, the needle of the ampere-hour meter will move away from switch 41, causing the latter to open, thus breaking the short circuit about resistance 38 and rendering the coil 35 ineffective to open the switch 16 when the generator again comes up to normal speed. Consequently, the battery will be recharged at the normal rate until the pointer of the meter again actuates switch 41. The function of winding 25 in neutralizing the effect of winding 13 in proportion to the lamp load, will take place when the windings 13 and 31 are jointly controlling the output of the generator, just the same as it does when the winding 13 alone is controlling the generator, so that when the battery is fully charged, the generator will supply current to take care of the lamp load over and above the small maintaining current, which goes to the battery.

In systems that depend upon a voltage coil associated with the generator regulator for reducing the voltage of the generator when the battery becomes fully charged, such voltage coil is also utilized for holding down the generator voltage in case the battery circuit becomes disrupted. In the system of the present invention, provision is likewise made for protecting the lamps from abnormal voltage in case the battery circuit is broken. For this purpose the resistance 38 may be so proportioned that the abnormal voltage produced by the generator under these conditions will be sufficient to energize the coil 35 and open the switch 16, thus putting the winding 31 and coil 33 in series with the resistance 43, instead of the battery as under normal conditions. The effect of the winding 31 and coil 33 upon the generator regulator will reduce the generator voltage sufficiently to prevent any injury to the lamps.

It will be understood that in practice, the windings on the solenoid of the generator regulator, as well as the coils for controlling the switch 16, may be super-imposed upon their respective cores, but for convenience, they have been shown separated longitudinally in the diagram. It will also be understood that in place of the current-measuring instrument 21, any other instrument adapted to measure the charge and discharge of the battery may be employed, and in fact, the short-circuiting of the resistance 38 may be controlled by a voltage responsive relay connected between the main conductors, as is common in systems of the prior art. It will also be understood that various other changes may be made in the details of the system without departing from the principle of the present invention.

I claim:

1. In a system of the character described, the combination of a generator, a storage battery, circuit connections between the generator and the battery, a regulator for said generator provided with a main series winding in the charging circuit and a second series winding wound to assist said main series winding but which is normally ineffective, and means for rendering said second series winding effective in conjunction with said main series winding to regulate the generator when the battery reaches a predetermined condition of charge.

2. In a system of the character described, the combination of a generator, a storage battery, circuit connections between the generator and the battery, a regulator for said generator provided with a main series winding in the charging circuit and a second series winding wound to assist said main series winding but which is normally ineffective, means for measuring the quantity of electricity supplied to the battery, and means under the control of said measuring means for rendering said second series winding effective in conjunction with said main series winding to regulate the generator when said measuring means indicates a predetermined condition of battery charge.

3. In a system of the character described, the combination of a generator, a storage battery, circuit connections between the generator and the battery, a regulator for said generator provided with a main series winding in the charging circuit and a second series winding wound to assist said main series winding, means for rendering said second series winding ineffective while the battery is being charged, and means for nullifying said first-named means when the battery reaches a predetermined condition of charge to cause said second series winding to become effective in conjunction with said main series winding to regulate the generator.

4. In a system of the character described, the combination of a generator, a storage battery, circuit connections between the generator and the battery, a regulator for said generator provided with a main series winding in the charging circuit and a second series winding wound to assist said main series winding, means for short-circuiting said second series winding to render the same ineffective while the battery is being charged, and means for rendering said short-circuiting means ineffective when the battery reaches a predetermined condition of charge.

5. In a system of the character described, the combination of a generator, a storage battery, circuit connections between the generator and the battery, a regulator for said generator provided with a main series winding in the charging circuit and a second series winding wound to assist said main series winding, means for short-circuiting said second series winding to render the same ineffective while the battery is being charged, means for measuring the quantity of electricity supplied to the battery, and means under the control of said measuring means for rendering said short-circuiting means ineffective when said measuring means indicates a predetermined condition of battery charge.

6. In a system of the character described, the combination of a generator, a storage battery, circuit connections between the generator and the battery, a regulator for said generator provided with a main series winding in the charging circuit, and a second series winding to assist said main series winding, a switch adapted to establish a short circuit about said second series winding to render the same ineffective while the battery is being charged, and means for opening said switch to render said second series winding effective in conjunction with said main series winding to regulate the generator when the battery reaches a predetermined condition of charge.

7. In a system of the character described, the combination of a generator, a storage battery, circuit connections between the generator and the battery, a regulator for said generator provided with a main series winding in the charging circuit, and a second series winding wound to assist said main series winding, a switch adapted to establish a short circuit about said second series winding to render the same ineffective while the battery is being charged, means for measuring the quantity of electricity supplied to the battery, and means under the control of said measuring means for opening said switch to render said second series winding effective in conjunction with said main series winding to regulate the generator when said measuring means indicates a predetermined condition of battery charge.

8. In a system of the character described, the combination of a generator, a storage battery, circuit connections between the generator and the battery, a regulator for said generator provided with a main series winding in the charging circuit, and a second series winding wound to assist said main series winding, a switch adapted to establish a short circuit about said second series winding to render the same ineffective while the battery is being charged, a coil for controlling said switch, and means for causing said last-named coil to be energized to open said switch and render said second series winding effective in conjunction with said main series winding to regulate the generator when the battery reaches a predetermined condition of charge.

9. In a system of the character described, the combination of a generator, a storage battery, circuit connections between the generator and the battery, a regulator for said generator provided with a main series winding in the charging circuit, and a second series winding wound to assist said main series winding, a switch adapted to establish a short circuit about said second series winding to render the same ineffective while the battery is being charged, a coil for controlling said switch, means for measuring the quantity of electricity supplied to the battery, and means under the control of said measuring means for causing said controlling coil to be energized to open said switch and render said second series winding effective in conjunction with said main series winding to regulate the generator when said measuring means indicates a predetermined condition of battery charge.

10. In a system of the character described, the combination of a generator, a storage battery, circuit connections between the generator and the battery, a regulator for said generator provided with a main series winding in the charging circuit, and a second series winding wound to assist said main series winding, a switch adapted to establish a short circuit about said second series winding to render the same ineffective while the battery is being charged, a coil for controlling said switch, means for causing said controlling coil to be energized to open said switch and render said second series winding effective in conjunction with said main series winding to regulate the generator when the battery reaches a predetermined condition of charge, and a second coil associated with said switch for holding the same open after it has been opened by said controlling coil.

11. In a system of the character described, the combination of a generator, a storage battery, circuit connections between the generator and the battery, a regulator for said generator provided with a main series winding in the charging circuit, and a second series winding wound to assist said main series winding, a switch adapted to establish a short circuit about said second series winding to render the same ineffective while the battery is being charged, a coil for controlling said switch, means for causing said controlling coil to be energized to open said switch and render said second series winding effective in conjunction with said main series winding to regulate the generator when the battery reaches a predetermined condition of charge, and a second coil associated with said switch and connected in series with said second series winding for holding said switch open while said second series winding is effective in regulating the generator.

12. In a system of the character described, the combination of a generator, a storage battery, circuit connections between the generator and the battery, a regulator provided with a series coil composed of a pair of windings, means for rendering one of said windings ineffective during the normal charging of the battery, whereby the other of said windings is alone effective in regulating the generator, and means for nullifying the effect of said first-named means when the battery becomes fully charged to cause said first-named winding to coöperate with said other winding in regulating the generator.

13. In a system of the character described, the combination of a generator, a storage battery, circuit connections between the generator and the battery, a regulator provided with a series coil composed of a pair of windings, means for establishing a short circuit about one of said windings during the normal charging of the battery whereby the other of said windings is alone effective in regulating the generator, and means for opening the short circuit when the battery becomes fully charged to cause said first-named winding to coöperate with said other winding in regulating the generator.

14. In a system of the character described, the combination of a generator, a storage battery, circuit connections between the generator and the battery, a regulator provided with a series coil composed of a winding formed of relatively coarse wire and a winding formed of relatively fine wire, means for rendering said fine wire winding ineffective during the normal charging of the battery whereby said coarse wire winding is alone effective in regulating the generator, and means for nullifying the effect of said first-named means when the battery becomes fully charged to cause said fine wire winding to coöperate with said coarse wire winding in regulating the generator.

15. In a system of the character described, the combination of a generator, a storage battery, circuit connections between the generator and the battery, a regulator for said generator provided with a main series winding in the charging circuit and a second series winding wound to assist said main series winding but which is normally ineffective, and means for rendering said second series winding effective in conjunction with said main series winding to regulate the generator when the battery reaches a predetermined condition of charge, translating devices, circuit connections between said translating devices and said first-named circuit connections, and a winding in said circuit connections of the translating devices and associated with said regulator, said winding being wound to oppose said main series winding to affect said regulator to cause said generator to supply current to said translating devices while charging the battery at the normal rate.

In testimony whereof I affix my signature.

THOMAS L. MOUNT.